United States Patent Office 3,521,154
Patented July 21, 1970

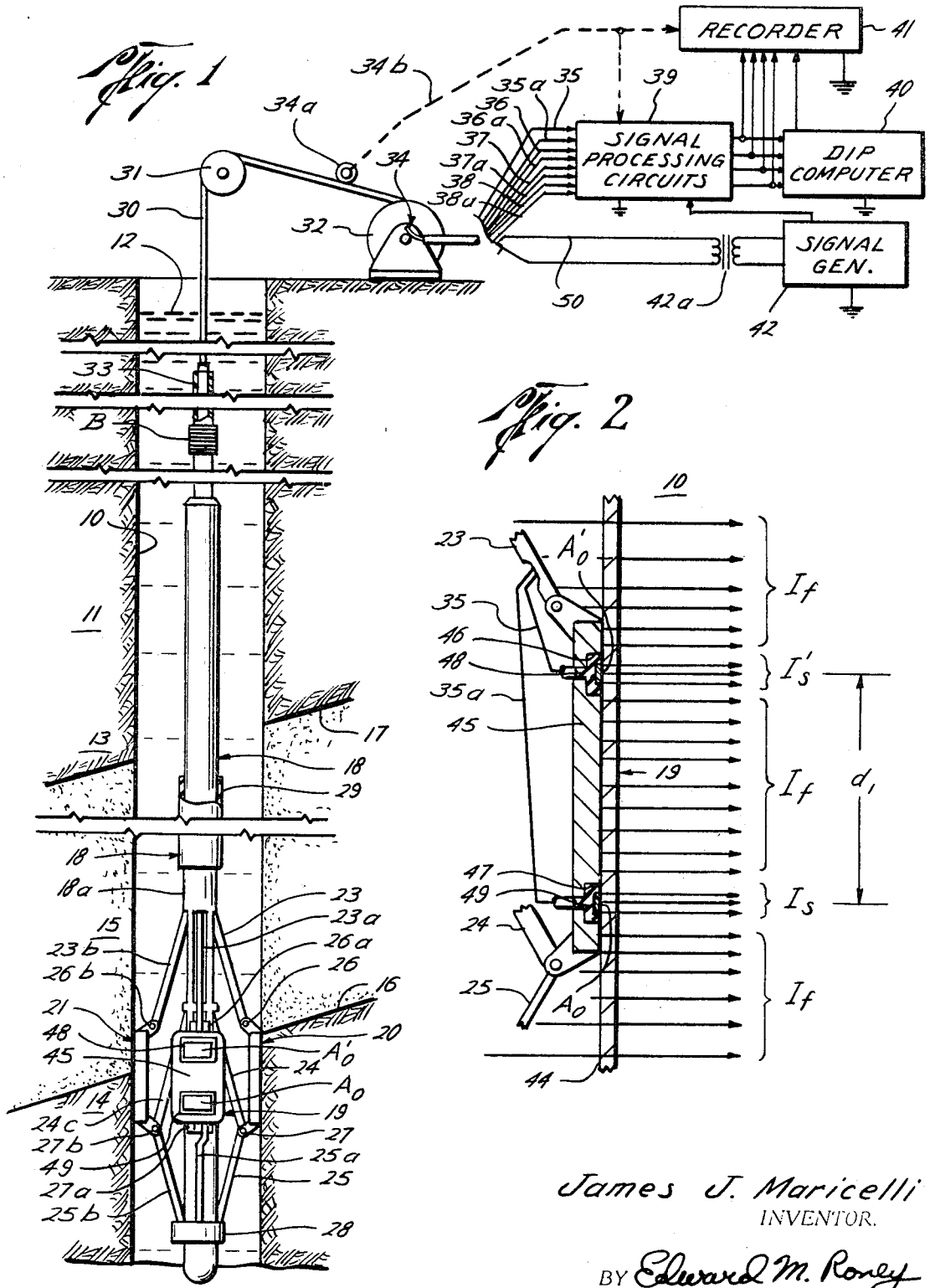

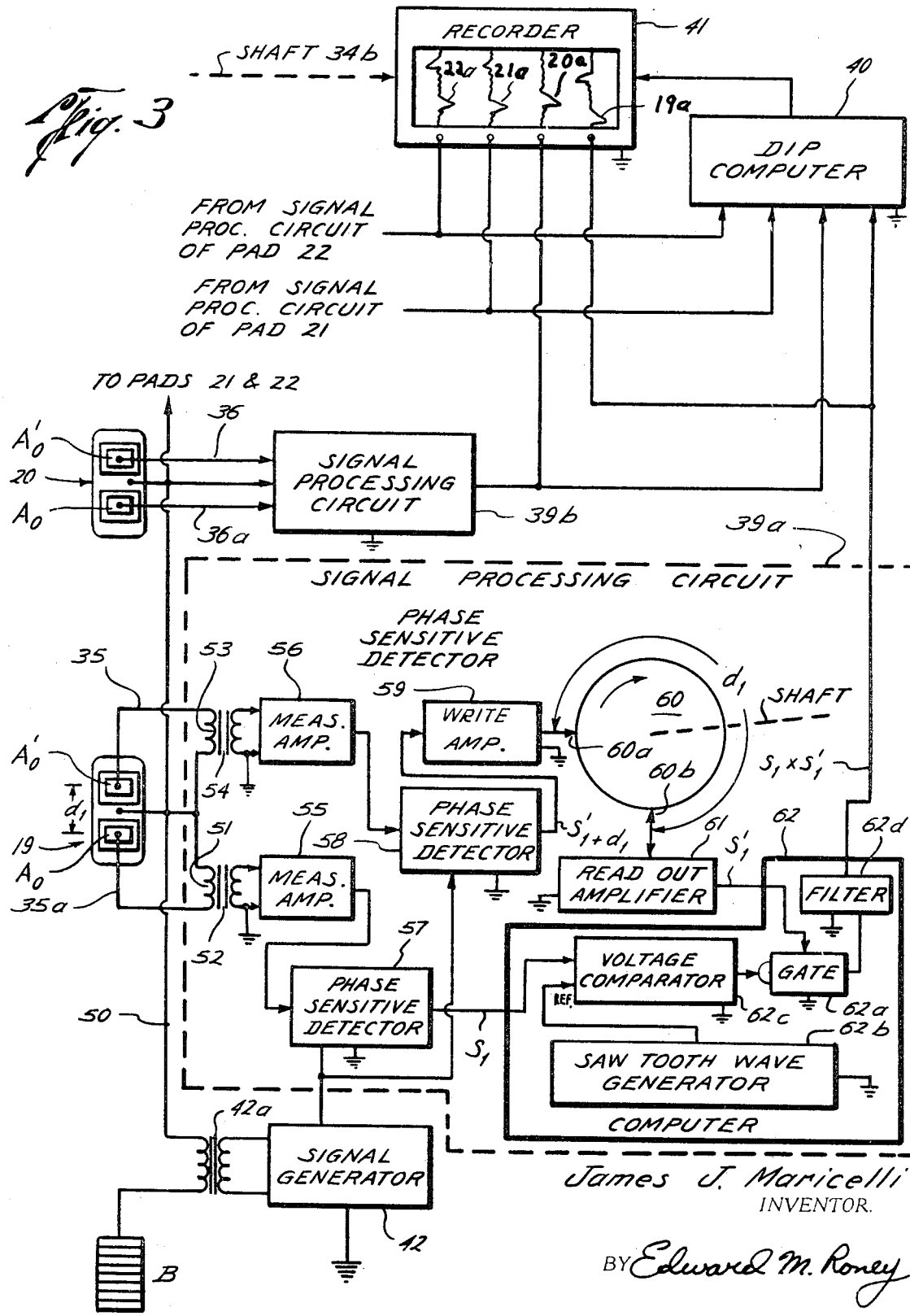

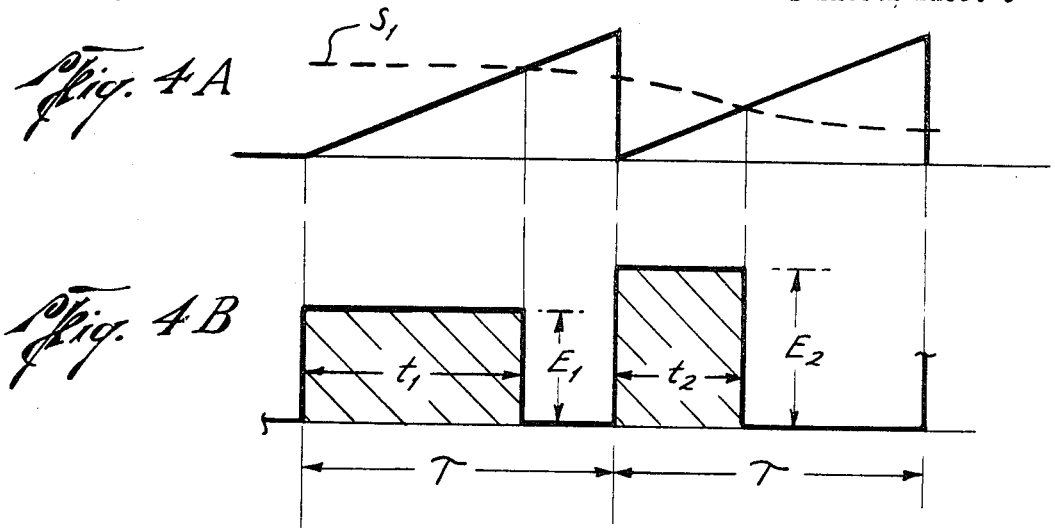
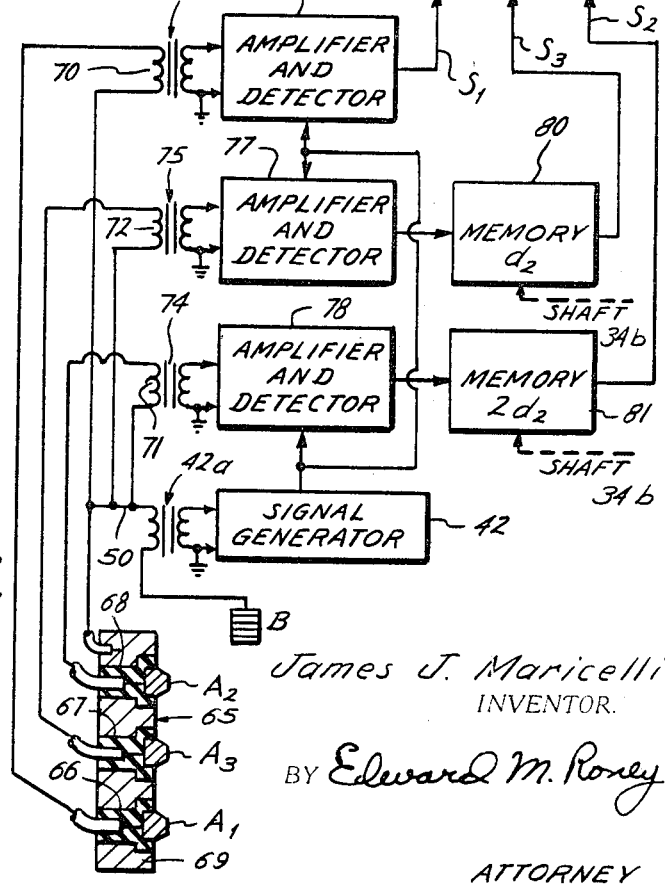

3,521,154
METHODS AND APPARATUS FOR ENHANCING WELL LOGGING SIGNALS BY THE USE OF MULTIPLE MEASUREMENTS OF THE SAME FORMATION CHARACTERISTIC
James J. Maricelli, Houston, Tex., assignor to Schlumberger Technology Corporation, Houston, Tex., a corporation of Texas
Filed July 3, 1967, Ser. No. 650,875
Int. Cl. G01v 3/18
U.S. Cl. 324—10                              14 Claims

ABSTRACT OF THE DISCLOSURE

The particular embodiments described herein as illustrative of the invention describe a technique for enhancing the quality of well logging signals which is especially useful for dipmeter surveys. One embodiment shows a survey electrode located a given depth interval from another survey electrode and depth synchronizing the signals derived from both survey electrodes. The depth synchronized signals are then multiplied together to produce one resulting signal with an enhanced information content but a minimized noise content. Another embodiment shows a plurality of survey electrodes having different relative locations, as for example, horizontal displacement, to produce the desired results.

---

This invention relates to electrical apparatus for processing signals derived from apparatus for investigating subsurface earth formation traversed by a borehole. More particularly, the invention relates to the enhancement of signals derived from such investigating apparatus to increase the signal to noise ratio of such signals.

One manner of investigating subsurface earth formations is to move a system of electrodes through the borehole on the end of a cable and determine the resistance presented by the earth formations to the flow of electrical current emitted from one or more of the electrodes. An electrical log obtained in this manner aids in determining the nature and lithological character of the various subsurface formations.

A problem that is sometimes encountered when investigating subsurface earth formations is that the signal received from the investigating apparatus is quite noisy. This noise can be generated in the various electronic circuits, both in the tool and at the surface of the earth, or it can be caused by cross talk between various signals on the cable conductors. One popular type of electrode investigating apparatus is the so-called "pad mounted electrode" system where electrodes are mounted on pads which are adapted to engage the borehole wall. In the case of such pad mounted electrodes, the rugosity of the borehole can also cause noise.

For present purposes, noise can be defined as any component of the signal derived from the downhole investigating apparatus other than the information which it is desired to obtain. For example, in the case of hole rugosity, the mud usually present in the borehole will fill in any void spaces between the electrodes and the borehole wall. If the mud conductivity is different from the formation conductivity, as it many times is, this will cause the measured conductivity to differ from the conductivity of the formations which it is desired to investigate. Thus, this difference between the actual measured conductivity and the true conductivity of the formation can be considered to be noise.

This noise problem is especially troublesome when utilizing so-called "dipmeter" apparatus to determine dip of boundary planes between adjoining formations beds. This dipmeter apparatus, in its most common form, utilizes a plurality of pad mounted electrode arrays located at several circumferential points around the borehole wall. The logs derived from each of these pad mounted electrode arrays is then utilized to determine the dip of the bedding planes between the various formation strata. Normally, azimuth, relative bearing, and tool inclination information is also measured and transmitted to the surface of the earth to complete the picture.

It can be appreciated that, in this dipmeter case, it is very important that the signal to noise ratio be favorable since, if there is too much noise in the signals derived from one of the circumferentially displaced pads, it may be difficult to accurately determine the dip of the boundary planes when correlating the various logs. This problem becomes even more acute when oil base muds are present in the borehole, due to the extremely high resistivity of the mud. When a borehole is filled with such oil base mud, so-called "knife-edge electrodes" are many times used to insure better contact with the mudcake which usually forms on the side of the borehole. By so doing, the conductivity signal derived from each pad will be more accurately representative of the true conductivity of the adjoining formations. However, even when using such knife-edge electrodes in oil base mud, there can still be appreciable noise contributed by the unpredictable nature of the contact resistance, i.e. the resistance between the knife-edge and the mudcake lining the borehole wall. It can be appreciated that since oil base mud itself is relatively nonconductive, even the slightest separation between the knife-edge and the mudcake will provide erroneous indications of the conductivity of the adjoining formations.

Another source of noise concerns the sometimes nonsymmetrical invasion of the oil base mud into the adjoining formations. Again, since the oil base mud is relatively resistive, it can be seen that if the depth of invasion into the surrounding formations is greater opposite one of the pads than the other pads, the conductivity measured by the electrodes on said one pad will be much less than the conductivity measured by the electrodes on the other pads, and thus the determination of dip will be inaccurate.

It is therefore an object of the present invention to provide new and improved methods and apparatus for improving the quality of well logging signals.

It is another object of the present invention to provide new and improved methods and apparatus for increasing the signal to noise ratio of well logging signals.

It is still a further object of the present invention to provide new and improved methods and apparatus for enhancing the quality of signals derived from electrodes mounted on pads adapted to engage the borehole wall.

In accordance with the present invention, methods and apparatus for processing well logging signals comprises deriving a plurality of well logging signals, each signal representative of a formation characteristic measured from investigating means displaced a given distance from each other investigating means in the borehole and correlating the well logging signals derived from the plurality of investigating means to obtain one signal more accurately representative of the investigated formation characteristic.

For a better understanding of the present invention, together with other and further objects thereof, reference is had to the following description taken in connection with the accompanying drawings, the scope of the invention being pointed out in the appended claims.

Referring to the drawings:

FIG. 1 shows investigating apparatus of the pad mounted electrode type in a borehole along with representations of electrical circuitry at the surface of the earth for deriving well logging signals;

FIG. 2 is an enlarged cross-sectional view of a portion of the borehole and apparatus shown in FIG. 1;

FIG. 3 shows a schematic representation of one embodiment of electrical circuitry for processing well logging signals in accordance with the present invention;

FIGS. 4a and 4b show wave forms at various points in the FIG. 3 circuit;

FIG. 5a shows a front view of another embodiment of a pad mounted electrode array constructed in accordance with the present invention; and FIG. 5b shows a cross-sectional view of the pad member of FIG. 4a taken along the section lines 4b—4b of FIG. 4a along with a schematic representation of electrical circuitry for processing well logging signals in accordance with the present invention.

Referring now to FIG. 1, there is shown an investigating apparatus in a borehole 10 for investigating earth formations 11. The borehole 10 has a suitable drilling mud located therein. Typical earth formations are represented by shale formations 13 and 14 with an intervening sand formation 15. Typical boundaries 16 and 17 are shown between the different formations. The downhole investigating apparatus includes an elongated support member 18 adapted for movement through the borehole 10. The downhole investigating apparatus additionally includes four pads designated 19, 20, 21 and 22 (the front pad member 19 obscures the view of the back pad member 22, which is not shown).

The pad members 19–22 are adapted to be pushed outward and away from the central support member 18 toward the wall of the borehole. To accomplish this, concerning pad 20, suitable support arms 23, 24 and 25 are pivotally coupled between the electrode pad 20 and housing 18, the support arms being pivotally connected at points 26 and 27 by suitable hinge means. The lower end of support arm 25 is pivotally coupled to a slidable collar member 28. The other pad members 19, 21 and 22 are coupled to the support member 18 in the same manner and have the same numerical designations except that the reference numerals "a" and "b" have been assigned to pads 19 and 21 respectively to show the similar apparatus. Suitable actuating means are contained within the housing 18 for urging the upper support arms outwardly thereby to urge the electrode pads against the borehole wall.

The pads 19–22 also each include a pair of survey electrodes $A_0$ and $A_0'$. Referring to pad 19 as exemplary of all of the pads, the survey electrode $A_0$ is surrounded by an insulation material 49 and the electrode $A_0'$ is surrounded by an insulation material 48. The insulation material 48 and 49, and thus also the survey electrodes $A_0$ and $A_0'$, are surrounded by a main metal portion 45 of the pad 19. The main metal portion 45 of the pads along with the arms 23, 24, 25, 23a, 24a, etc. and the lower conductive portion of the central support member 18 are all electrically connected together and comprise a composite focusing electrode for confining the survey current emitted from the various survey electrodes to a desired current flow pattern. The interiors of the upper support arms 23, 23a, and 23b (as well as those associated with the hidden pad 22) are hollow and the insulated electrical conductors from each electrode pad extend through the corresponding arms thereof to suitable electrical circuits contained within a fluid-tight instrument housing within support member 18, or alternatively to pass to the surface of the earth.

At least a portion of the support member 18 located adjacent the pad members 19–22 is formed of an electrically conductive metal. A suitable insulation material 29 covers the upper portion of the central support member 18. The junction of the insulation material 29 with the lower metal portion of the support member 18 includes a suitable nonconductive insert or insulating member (not shown) which insures that the metal above this point will not be at the same potential as the lower portion of the support member 18. The details of the mechanical construction are shown in U.S. Pat. No. 2,060,373 granted to H. G. Doll on Oct. 23, 1962.

The upper end of the support member 18 is connected by means of an armored multiconductor cable 30 to suitable apparatus at the surface of the earth for raising and lowering the downhole investigating apparatus through the borehole 10. To this end, the multiconductor cable 30 passes over a sheave 31 and then to a suitable drum and winch mechanism 32. The first hundred feet or so of the multiconductor cable 30 just above the support member 18 is covered with insulation material 33. There is secured to the exterior of the insulation material 33 a suitable current return electrode B a suitable distance above the top of the support member 18.

Electrical connection between the various conductors of the multiconductor cable 30 and the various electrical circuits at the surface of the earth is accomplished by means of a suitable multielement slip ring and brush contact assembly 34. In this manner, the conductors 35, 35a, 36, 36a, 37, 37a, 38 and 38a which originate from the downhole investigating apparatus are supplied to a signal processing circuit 39 which supply the processed signals to a dip computer 40 and a recorder 41, the dip computer 40 also supplying a signal to recorder 41. Additionally, a suitable signal generator 42 supplies current downhole via a transformer 42a, signal processing circuits 39. The details of this circuitry are shown in FIG. 3.

Referring to FIG. 2, there is shown a cross section view of the pad 19 pressed up against mudcake 44 lining the borehole wall and a portion of the support arms 23, 24 and 25. Considering the pad 19, the central metal portion 45 has hollowed out sections 46 and 47 which contain the insulation material 48 and 49. Embedded in the insulation material 49 is the lower survey electrode $A_0$, and the upper survey electrode $A_0'$ is embedded in the insulation material 48. The conductors 35 and 35a connect the electrodes $A_0'$ and $A_0$ respectively through the hollowed out arms 23, 23a, etc. and the cable 30 to the electrical circuitry at the surface of the earth.

Now, referring to FIG. 3, there is shown the electrical circuitry connected to the electrodes. The signal generator 42 supplies current between the composite focusing electrode of the downhole investigating apparatus and the current return electrode B via the transformer 42a. The voltage developed across the secondary winding of transformer 42a is substantially constant. Referring to the circuitry associated with pad 19, the conductor 50 from the secondary winding of transformer 42a supplies survey current via the primary winding 51 of a transformer 52 to the lower survey electrodes $A_0$ of pad member 19 on conductor 35a. In like fashion, the conductor 50 supplies survey current via the primary winding 53 of a transformer 54 to the upper survey electrode $A_0'$ on conductor 35. The impedance of the primary windings 51 and 53 is sufficiently low so that the potential of survey electrodes $A_0$ and $A_0'$ will be substantially the same as the potential of the common focusing electrode. In this manner, the survey current emitted from the survey electrodes is focused to a desired current flow pattern, i.e., outwardly into the adjoining formations. The current which is supplied to lower survey electrode $A_0$ will induce a voltage in the secondary winding of transformer 52 proportional to the survey current supplied to survey electrode $A_0$, which voltage is measured by a measure amplifier 55. In like fashion, the current supplied to upper survey electrode $A_0'$ is measured by a measure amplifier 56.

Now referring back to FIG. 2, there is shown current flow lines emanating from the survey and focusing electrodes through the mudcake 44 into the surrounding earth formations 10. It can be seen that the survey current $I_s$ emitted from survey electrode $A_0$ will be confined to a relatively narrow region of the surrounding earth formations by the focusing current $I_f$. In like fashion, the survey current $I_s'$ emitted from survey electrode $A_0'$ will be confined to a relatively narrow region by the focusing current $I_f$ emitted from the composite focusing electrode. Thus, it can be seen that the survey currents $I_s$ and $I_s'$ will be representative of relatively narrow formation slices which are an interval $d_1$ apart (this interval $d_1$ is the distance between survey electrodes $A_0$ and $A_0'$). It can also be seen that the survey current emitted from survey electrodes $A_0$ and $A_0'$ will be entirely separate from one another, i.e. one will not be influenced by the other and thus two entirely separate measurements can be made on the same pad member. This also applies to the remaining pad members also.

Now referring back to FIG. 3, the output signal from measure amplifier 55 is applied to a phase-sensitive detector 57 to which also is supplied a phase-reference signal from signal generator 42. The output signal $S_1$ from phase-sensitive detector 57 is proportional to that portion of the measured survey current which is in-phase with the phase-reference signal from signal generator 42. Thus, this signal $S_1$ is proportional to the conductivity of the earth formations slab opposite lower survey electrode $A_0$ since the voltage on all of the electrodes is substantially constant. In like fashion, the output from measure amplifier 56 is applied to a phase-sensitive detector 58 to which also is supplied a phase-reference signal from signal generator 42. The output signal from phase-sensitive detector 58, which is proportional to the conductivity measured by upper survey electrode $A_0'$ is designated $S_1'+d_1$. The $+d_1$ designation represents the fact that upper survey electrode $A_0'$ is a depth interval $d_1$ above survey electrode $A_0$.

This signal $S_1'+d_1$ is supplied to a write amplifier 59 which writes the signal $S_1'+d_1$ at a write point 60a of a rotating memory 60, which rotates in a clockwise direction. The details of the rotating memory 60 are not shown, but rotating memory 60 could comprise any suitable memory device such as a magnetic memory. Or, it could take the form of a capacitor memory, such as the type disclosed in U.S. Pat. No. 3,181,117, granted to W. J. Sloughter on Apr. 27, 1965. In this capacitor case, the output impedance of write amplifier 59 would be low so that the capacitors could rapidly charge or discharge to the proper value. Located a clockwise interval $d_1$ is a read-out contact 60b which supplies the read-out signal $S_1'$ through a read-out amplifier 61 to a correlator 62, to which also is supplied the signal $S_1$ from phase-sensitive detector 57.

Since the depth interval between upper and lower survey electrodes $A_0$ and $A_0'$ is $d_1$, the memorization or delay of the upper survey electrode conductivity signals $S_1'$ will be in depth synchronization with the lower survey electrode conductivity signal $S_1$. These signals $S_1$ and $S_1'$ are then combined in a computer to enhance the well logging signals. The output of computer 62 is supplied to the dip computer 40 and recorder 41.

The computation by computer 60 takes the form of multiplying the two signals $S_1$ and $S_1'$ together. In computer 62, this is accomplished by utilizing the signal $S_1$ to control the duty cycle of a gate circuit 62a to which the read-out signal $S_1'$ is supplied and filtering the output pulses from gate 62a in a filter 62d. The time base for this operation is provided by a sawtooth wave generator 62b whose output signal is supplied to the reference input to a voltage comparator. The signal voltage input to comparator 62c is the lower survey electrode signal $S_1$.

To better understand this operation of computer 62, refer to FIGS. 4a and 4b. The solid line sawtooth wave shape of FIG. 4a of constant frequency $1/\tau$, (or period $\tau$) represents the output signal from sawtooth wave generator 62b and the dotted line of FIG. 4a represents the lower survey electrode signal $S_1$. FIG. 4b represents the output signal from gate 62a. The "on-time" of gate 62a is the time required for the sawtooth wave shape to increase to the voltage of the signal $S_1$, which time is designated $t_1$ and $t_2$ in FIG. 4b. This "on-time" is then proportional to the magnitude of the signal $S_1$. The amplitude of the FIG. 4b pulses represents the amplitude of the read-out signal $S_1'$, and are designated $E_1$ and $E_2$ in FIG. 4b. It can be seen that the areas $t_1 \times E_1$ and $t_2 \times E_2$ of each pulse of FIG. 4b is proportional to the two signals $S_1$ and $S_1'$ multiplied together. Since the period $\tau$ is always constant, filter 62d will then produce an output signal proportional to the product $S_1 \times S_1'$.

This same operation is repeated for each of the other pad members 20, 21 and 22. Thus, for pad member 20, the conductors 36 and 36a from survey electrodes $A_0'$ and $A_0$ respectively are supplied to a signal processing circuit 39b to which also is supplied the signal from signal generator 42. Thus, signal processing circuit 39b acts in an identical manner as the signal processing circuit 39a on the signals from the survey electrodes of pad member 20. In like fashion, there are two more signal processing circuits identical to the signal processing circuit 39a for processing the signals from the electrodes $A_0$ and $A_0'$ of pads 21 and 22.

The output of the computer 62 of each of the signal processing circuits 39a, 39b, etc. are supplied to the dip computer 40 and to the recorder 41. The dip computer 40 computes the dip of the boundary planes in response to the conductivity signals supplied from each of the pads in a well known manner and supplies the resulting computed dip indications to the recorder 41. The curves for the conductivity signals obtained from each of the pads are shown in recorder 41. By well known techniques, like signal characteristics are utilized to determine the dip of the boundary planes. Such like signal characteristics are presented on the recording medium of recorder 41 by the signal fluctuations 19a, 20a, 21a and 22a, which corresponds to signals obtained from each of the pads 19–22. It can be appreciated that if an undesirable amount of noise should be present in the conductivity signal derived from one or more of the pads 19–22, it would be exceedingly difficult to correlate the signals to determine dip.

However, the apparatus of the present invention, by positioning two survey electrodes one above the other, and correlating the signals derived from both electrodes by depth synchronizing the signals and multiplying them together, substantially reduces the noise component of the conductivity signal for each pad, and thus enhances the information component of the signals. The reason for this is that the true, noiseless conductivity of any given vertical point in the borehole, at a selected circumferential point, will be the same regardless of whether the upper or lower survey electrodes is measuring it. Thus, the true conductivity measured by both the upper and lower survey electrodes will be the same regardless of other considerations.

However, the noise component of the signal measured by both survey electrodes will, for the most part, be a random function. That is to say, the same factor which contributes noise to the signal derived from upper survey electrode $A_0'$ will, in all likelihood, not occur in the same magnitude and phase when the lower survey electrode $A_0$ has moved uphole to the depth at which the noise occurred in the upper survey electrode $A_0'$ signal. Thus, on an average, the random nature of the noise will be substantially reduced and at the same time, the signal component of the conductivity signal corresponding to each pad member will be substantially enhanced. In other words, the information content of the measured signals will always be in-phase and thus substantially increased by the multiplication, but the noise component, because of its random nature, will not be in-phase, and thus the multiplication process will tend to reduce the noise component of the received signal in relation to the true information component thereof.

Another factor concerning this signal enhancement is that if the information component of the signal derived from each survey electrode is greater than the noise component thereof at any given instant, the signal to noise ratio will be substantially improved by multiplying the signals together. This can better be seen by a numerical example. If it is assumed that the information component of the signals $S_1$ and $S_1'$ is 10 units each, and the noise components are 5 units and 3 units respectively, it can be seen that the signal to noise ratio of the depth shifted upper survey electrode signal $S_1'$ is 5 and the signal to noise ratio of the lower survey electrode signal is 2. However, by multiplying the two signals derived from both survey electrodes together, it can be seen that the signal component is 100 and the noise component is 10, thus giving a signal to noise ratio of 10, for the combined signals. This, then represents a better signal to noise ratio than for the signal derived from either one of the survey electrodes.

It is to be understood that the present invention is not limited to just two electrodes on each pad but there could be any desirable number of electrodes. The more electrodes on each pad, of course, the better will be the signal to noise ratio of the resulting correlated signal for each pad. Looking now at FIG. 5a, there is shown a pad 65 having two vertically displaced electrodes $A_1$ and $A_2$ and a third vertically and horizontally displaced electrode $A_3$. The vertical displacement between electrodes $A_1$ and $A_3$ and $A_3$ and $A_2$ is $d_2$. The electrodes $A_1$, $A_2$ and $A_3$ are of the type commonly referred to as knife-edge electrodes. Again, there is suitable insulation material 66, 67 and 68 insulating each survey electrode from the main metal portion 69 of the pad 65. Again, the pad 65, in combination with the support member 18 (not shown) and linking arms (not shown) constitute a composite focusing electrode.

Referring to FIG. 5b, there is shown a cross-sectional view of the pad 65 of FIG. 5a taken along the section line 5b—5b thereof. The knife-edge survey electrodes $A_1$, $A_2$, $A_3$ which are made of conductive metal, have their base portion embedded in the insulating material 66, 67 and 68, through which passes the conductors connecting the survey electrodes to the electrical circuitry. The signal generator 42 supplies current between the focusing electrode portion of the downhole investigating apparatus (shown in FIG. 4b as being connected to the metal portion 69 of the pad 65) and the current return electrode B. Survey current is supplied to the survey electrodes $A_1$, $A_2$ and $A_3$ through the primary winding 70, 71, 72 of transformers 73, 74 and 75 from the conductor 50 which supplies current to the focusing electrode of the downhole investigating apparatus. As in the FIG. 3 apparatus, the impedance of the primary windings 70, 71 and 72 is substantially low so that the potential of the survey electrodes $A_1$, $A_2$ and $A_3$ is substantially the same as the potential of the common focusing electrode.

Thus, as in the FIG. 3 apparatus, a voltage is induced in the secondary winding of each transformer 73, 74, 75 proportional to the current emitted from the survey electrodes. These secondary windings are supplied to suitable amplifiers and phase-sensitive detectors 76, 77 and 78 which are identical to and operate in the same manner as measure amplifier 56 and phase-sensitive detector 58 of FIG. 3. The resulting output signal from amplifier and detector 76, designated $S_1$, which is proportional to the survey current emitted by survey electrode $A_1$, is supplied to a computer 79. The output signal from amplifier and detector 77, which is proportional to the survey current emitted by survey electrode $A_3$, is supplied to a memory 80 which depth shifts the signal by the depth interval $d_2$. The resulting output signal from memory 80, designated $S_3$, is supplied to compter 79. Likewise, the output signal from amplifier and detector 78, which is proportional to the survey current emitted by survey electrode $A_2$, is supplied to a memory 81 which, after a depth shift of $2d_2$ supplies the output signal, designated $S_2$, to the computer 79. The memories 80 and 81 are driven by the shaft 34b. It can be seen that the signals $S_1$, $S_2$ and $S_3$ derived from the survey electrodes $A_1$, $A_2$ and $A_3$, after the depth shifting by memories 80 and 81, are effectively all representative of measured conductivity at the same depth level in the borehole, but not the same slice of formation since $A_3$ is horizontally displaced. The signals $S_1$, $S_2$ and $S_3$ are multiplied together in computer 79. Computer 79 could be constructed similarly to computer 62 of FIG. 3, but using two multiplication circuits. That is, the multiplication of $S_1$ times $S_2$ could take place in one multiplying circuit and the multiplication of $S_3$ times the result of $S_1 \times S_2$ could be performed in the second multiplying circuit.

Because of the horizontal displacement, any noise brought about by inconsistencies circumferentially around the borehole will be reduced (remember that noise is any signal component other than the true conductivity value). An example of such a horizontal inconsistency would be a localized caved-in portion of the mudcake lining the borehole wall. In this event, if the drilling mud were oil base, one or more of the knife-edge electrodes may not come in contact with the mudcake and thus a very high resistance would be measured by that particular electrode. Thus, by providing one electrode which is horizontally displaced from the other electrodes, this problem can be corrected to a great extent. The computer 79, by multiplying the signals $S_1$, $S_2$ and $S_3$ together, will thus provide greatly improved results in the quality of the conductivity signals derived from each pad.

It is to be understood that the particular number and arrangement of survey electrodes in accordance with the present invention would be limitless. The particular arrangement and number of the electrodes would be a matter of design choice depending on the particular conditions which are expected to be encountered.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. Apparatus for enhancing the quality of signals derived from a well logging tool in a borehole, comprising:
   (a) means for deriving a plurality of well logging signals representative of a formation characteristic at the same depth in the borehole, each such signal representative of the same formation characteristic measured over the same lateral interval from the borehole by plural investigating means each designed to measure said formation characteristic and displaced a predetermined vertical distance from each other investigating means in the borehole as each investigating means traverses said borehole depth; and
   (b) means for combining the plural well logging signals representative of the same formation characteristic derived from the plurality of investigating means at said depth to obtain one enhanced signal having an improved signal to noise characteristic and representative of the investigated formation characteristic at said depth.

2. The apparatus of claim 1 wherein the means for combining said plurality of well logging signals measured at said depth and over the same lateral interval from the borehole comprises means for multiplying the well logging signals together to obtain an enhanced signal more accurately representative of the investigated formation characteristic at said depth.

3. The apparatus of claim 1 wherein the means for deriving a plurality of well logging signals at the same borehole depth includes:
   (a) a wall-engaging pad adapted to be urged against the borehole wall and having at least two survey electrodes located a predetermined distance from one another and a focusing electrode surrounding the survey electrodes;
   (b) means for supplying current to the survey and focusing electrodes, the potential of the survey and focusing electrodes being substantially the same so that the survey current emitted from each survey electrode will maintain a desired current flow pattern into the earth formations surrounding the borehole so as to penetrate a desired lateral interval into the formation; and (c) means for measuring the current supplied to each survey electrode to provide well logging signals representative of the current emitted from the survey electrodes at a particular borehole depth and over said desired lateral interval.

4. The apparatus of claim 3 wherein one of the survey electrodes is displaced a given depth interval above the other survey electrode and the means for combining the well logging signals includes:

(1) means for memorizing the well logging signal derived from the upper survey electrode and reading it out at a later time so that the read-out well logging signal will be depth synchronized with the well logging signal derived from the lower electrode; and (2) means for multiplying the read-out well logging signal with the well logging signal derived from the lower electrode to provide said enhanced well logging signals having an improved signal to noise ratio.

5. The apparatus of claim 3 wherein at least two of said survey electrodes are horizontally displaced from each other.

6. Apparatus for enhancing the quality of signals derived from a well logging tool in a borehole comprising:

(1) a first investigating means adapted for movement through the borehole;

(2) a second investigating means located a predetermined depth interval above the first investigating means and adapted for movement through the borehole;

(3) means coupled to the first and second investigating means for deriving first and second well logging signals representative of the same formation characteristic measured over the same lateral interval from the borehole investigated by the first and second investigating means respectively;

(4) means for memorizing the second well logging signal and reading said second signal out at a later time so that the second well logging signal will be depth synchronized with the first well logging signal; and (5) means for combining the first well logging signal with the read-out second well logging signal to provide an enhanced signal having an improved signal to noise ratio and representative of the investigated formation characteristic at said depth level.

7. Apparatus for determining the dip of boundary planes between earth strata traversed by a borehole, comprising:

(a) a central support member adapted for movement through a borehole;

(b) at least three pads coupled to the central support member and adapted to be urged against the borehole wall, each pad having at least two survey electrodes displaced a given distance from one another and at least a portion of a focusing electrode;

(c) means for supplying current to the survey and focusing electrodes, the potential of the survey and focusing electrodes being substantially the same so that the survey current emitted from the survey electrodes will maintain a desired current flow pattern over the same lateral interval in the earth formations adjoining the borehole;

(d) means for measuring the survey current supplied to each survey electrode to provide well logging signals representative of conductivity measured by each survey electrode; and (e) means for individually combining the well logging signals representative of the conductivity measured by the survey electrodes on each pad to provide separate enhanced well logging signals having improved signal to noise ratios representative of the correlated conductivity measured by all of the electrodes of each pad whereby the correlated and enhanced well logging signals are utilized to determine the dip of said boundary planes.

8. The apparatus of claim 7 wherein the survey electrodes on each pad are vertically or depth displaced from each other and the means for individually combining the well logging signals of each pad includes:

(1) means for depth shifting at least one of the well logging signals representative of the conductivity over the same lateral interval from the borehole as measured by the survey electrodes on each pad so that all of said well logging signals are in depth synchronization; and (2) means for multiplying the depth synchronized well logging signals from the survey electrodes of each pad to provide said correlated well logging signals for each pad.

9. A method of enhancing the quality of signals derived from a well logging tool in a borehole, comprising:

(a) deriving a first well logging signal representative of a formation characteristic measured from a first investigating means at a selected depth in the borehole;

(b) deriving a second well logging signal representative of the same formation characteristic measured over the same lateral interval from the borehole by a second investigating means displaced a predetermined vertical distance from the first investigating means in the borehole as it traverses the same depth level at which the first signal was derived; and (c) combining the first and second well logging signals to obtain an enhanced signal having an improved signal to noise characteristic and representative of said investigated formation characteristic at said depth.

10. The method of claim 9 wherein the first and second investigating means are vertically or depth displaced from one wherein the step of combining the well logging signals includes:

(1) storing one of the well logging signals and reading it out at a later time so that the first and second well logging signals are depth synchronized with one another; and (2) multiplying the depth synchronized well logging signals to provide the enhanced signal.

11. A method of determining the dip of boundary planes between earth strata traversed by a borehole, comprising:

(a) moving a plurality of borehole wall-engaging pads through a borehole, each pad having at least two survey electrodes and at least part of a focusing electrode;

(b) supplying current to the survey and focusing electrodes, the survey and focusing electrodes being at substantially the same potential so as to maintain the survey current emitted from the survey electrodes in a desired current flow pattern over a desired lateral interval from the borehole;

(c) measuring the survey current supplied to the survey electrodes to provide well logging signals representative of the conductivity measured by each survey electrode at a selected depth and over said desired lateral interval; and (d) combining the well logging signals representative of the conductivity measured by each survey electrode of each pad individually to produce one enhanced well logging signal having an improved signal to noise ratio for each pad at each selected depth whereby the enhanced well logging signals for each pad can be utilized to determine the dip of the boundary planes.

12. The method of claim 11 wherein the survey electrodes on each pad are depth displaced with respect to each other and the step of combining includes:

(1) storing at least one of the well logging derived signals from one of the survey electrodes on each pad and reading out the stored well logging signals at later times to provide depth synchronized signals; and
(2) multiplying the depth synchronized signals derived from all of the survey electrodes on each pad to produce the enhanced well logging signals for each pad.

13. A method of enhancing the signal to noise ratio of well logging signals having a signal component and a noise component comprising the steps of:
deriving a plurality of redundant well logging signals each representative of the same formation characteristic at the same vertical depth and over the same lateral interval in the borehole as measured by a plurality of spaced apart investigating means and combining said redundant signals in a predetermined manner to produce one enhanced well logging signal representative of the same formation characteristic at the same depth and having a larger signal component to noise component ratio than any one of the plurality of redundant well logging signals has individually.

14. The method of claim 13 wherein the step of combining includes depth synchronizing said plurality of redundant signals measured by said plurality of spaced apart investigating means by storing each of said signals in a memory means until all such redundant measurements have been made and then multiplying all of said redundant signals together to obtain a signal proportional to their product.

References Cited

UNITED STATES PATENTS

| | | | |
|---|---|---|---|
| 2,436,503 | 2/1948 | Cleveland | 324—1 XR |
| 3,060,373 | 10/1962 | Doll | 324—10 XR |
| 3,075,142 | 1/1963 | Albright et al. | 324—1 |
| 3,136,942 | 6/1964 | Schuster | 324—10 XR |
| 3,166,708 | 1/1965 | Millican | 324—1 |
| 3,172,036 | 3/1965 | Waters | 324—1 |
| 3,180,141 | 4/1965 | Alger | 324—1 XR |
| 3,405,351 | 10/1968 | Schuster | 324—10 |

GERARD R. STRECKER, Primary Examiner

U.S. Cl. X.R.

340—18

20.1637

UNITED STATES PATENT OFFICE
CERTIFICATE OF CORRECTION

Patent No. 3,521,154        Dated July 21, 1970

Inventor(s) James J. Maricelli

It is certified that error appears in the above-identified patent and that said Letters Patent are hereby corrected as shown below:

Column 10, line 31 (application Claim 9, line 11) following "depth" delete -- level --.

SIGNED AND SEALED
OCT 13 1970

(SEAL)
Attest:

Edward M. Fletcher, Jr.
Attesting Officer

WILLIAM E. SCHUYLER, JR.
Commissioner of Patents